United States Patent [19]
Miyazaki et al.

[11] Patent Number: 5,799,977
[45] Date of Patent: Sep. 1, 1998

[54] GAS GENERATOR FOR SEAT BELT RETRACTING POWER GENERATING DEVICE

[75] Inventors: Hitoshi Miyazaki; Hitoshi Kunii; Takashi Sato; Kazuya Saito, all of Fukushima-ken, Japan

[73] Assignee: Nippon Koki Co., Ltd., Tokyo, Japan

[21] Appl. No.: 552,630

[22] PCT Filed: Jun. 26, 1995

[86] PCT No.: PCT/JP95/01272

§ 371 Date: Jan. 4, 1996

§ 102(e) Date: Jan. 4, 1996

[87] PCT Pub. No.: WO96/00157

PCT Pub. Date: Jan. 4, 1996

[30] Foreign Application Priority Data

| Jun. 27, 1994 | [JP] | Japan | 6-144949 |
| Jun. 5, 1995 | [JP] | Japan | 7-138344 |
| Jun. 19, 1995 | [JP] | Japan | 7-152012 |

[51] Int. Cl.$^6$ .................................... B60R 22/46
[52] U.S. Cl. .................... 280/806; 297/480; 102/204; 102/272
[58] Field of Search ................ 280/806, 734, 280/735; 297/480; 102/271, 272, 202, 204; 200/61.45 R

[56] References Cited

U.S. PATENT DOCUMENTS

| 2,703,531 | 3/1955 | Graumann et al. | 102/272 |
| 3,415,192 | 12/1968 | Stadler et al. | 102/204 |
| 3,499,386 | 3/1970 | Stadler et al. | 102/204 |
| 4,574,702 | 3/1986 | Brandt | 102/272 |
| 4,760,792 | 8/1988 | Dumas et al. | 102/272 |
| 5,279,227 | 1/1994 | Nishizawa | 280/806 |

FOREIGN PATENT DOCUMENTS

| 714634 | 11/1931 | France | 102/272 |
| LOP6-27132 | 2/1994 | Japan . | |
| LOP6-49235 | 7/1994 | Japan . | |
| LOP7-8113 | 2/1995 | Japan . | |
| LOP7-24434 | 5/1995 | Japan . | |

*Primary Examiner*—Paul N. Dickson
*Attorney, Agent, or Firm*—Kalish & Gilster

[57] ABSTRACT

This invention relates to a gas generator for a seat belt retracting power generating device to supply power to an emergency retracting device of a seat belt retractor, and aims to reliably ignite an ignition agent and a driving agent by concentrating flames into a small-diameter passage when a primer is ignited, quickly supplying heat to a gas generating agent chamber, and preventing the ignition agent and driving agent within the gas generating agent chamber from being damped. This invention comprises a cylindrical casing with its one end open, a cylindrical holder chamber disposed at one end of the casing, a gas generating agent chamber which is communicated with the holder chamber via a shoulder formed on the inner wall of the casing and has a diameter smaller than the inner wall of the holder chamber, an ignition agent and a driving agent housed in the gas generating agent chamber, a primer holder which is housed in the holder chamber and has a primer chamber open toward one end of the casing, a caulking part which is formed at one end of the casing to hold the primer holder, a primer held within the primer chamber, and a small-diameter passage which is formed in the primer holder, communicates the gas generating agent chamber and the primer chamber, and has an inverted conical-shaped part having a tapered angle of 60 to 120 degrees formed at its end on the primer chamber side.

3 Claims, 13 Drawing Sheets

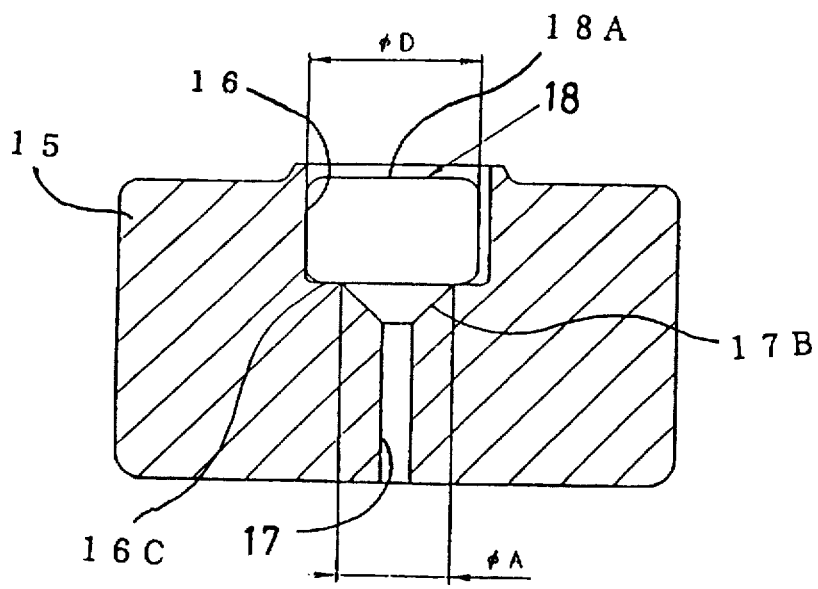
F I G. 1 3
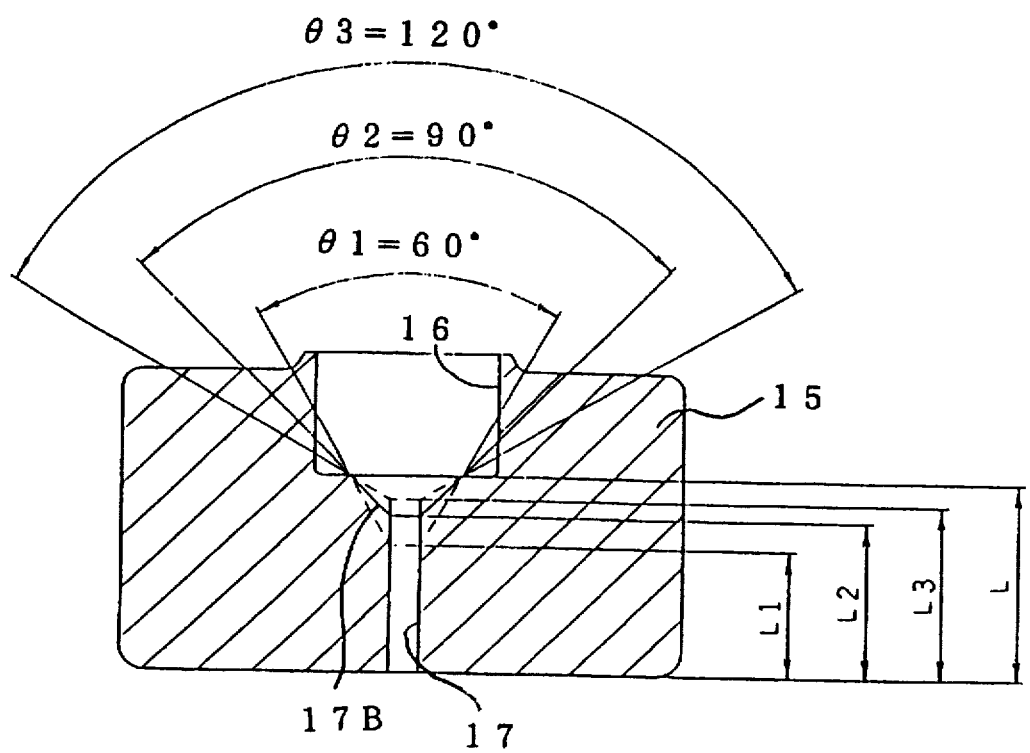
F I G. 1 4

PRIOR ART

GAS GENERATOR FOR SEAT BELT RETRACTING POWER GENERATING DEVICE

CROSS-REFERENCE TO RELATED APPLICATION:

This application is based on International Application No. PCT/JP95/01272 filed Jun. 26, 1995, and claims priority based upon Japanese Patent Applications No. 6-144949 filed Jun. 27, 1994; No. 7-138334 filed Jun. 5, 1995; and No. 7-1520212 filed Jun. 19, 1995.

BACKGROUND OF THE INVENTION

1. Field of the Invention

This invention relates to a gas generator for a seat belt retracting power generating device to supply power to an emergency retracting device of a seat belt retractor.

2. Description of the Related Art

General automobiles are provided with seat belts to protect the driver or passenger from shocks at a collision accident. The seat belt worn by the driver or passenger is restrained by a seat belt retractor.

And, it has been required these years that to protect the driver or passenger in case of panic stopping or collision, an emergency retracting device is disposed on a seat belt retractor for rewinding the seat belt, thereby instantaneously retracting the seat belt.

The above type of seat belt retractor is disclosed in Japanese patent Application Laid-open Print No. Hei 1-240345 for example.

This known seat belt retractor will be described with reference to FIG. 15.

In the drawing, a seat belt 104, pulled upward out of a seat belt retractor 103 which is fixed at the lower part of a center pillar 102 of a body work 101, is passed through a through ring 105 which is attached at the upper part of the center pillar 102, and extended downward. And, a seat belt end 107 is fixed to the rear on one side of a seat 106.

And, a tongue plate 108 is freely movably attached to the seat belt 104 between the through ring 105 and the seat belt end 107.

The passenger seated on the seat 106 pulls out the seat belt 104 from the seat belt retractor 103, and inserts the tongue plate 108 into a buckle 109 which is fixed to the rear on the other side of the seat 106 opposite to the seat belt end 107, thus the seat belt 104 crosses the passenger from shoulder to opposite hip.

This seat belt retractor uses the combustion gas from gunpowder as power for instantaneously retracting the seat belt. Specifically, the combustion gas from gunpowder instantaneously moves the piston within a cylinder, and a cable whose one end is connected to the piston is moved to retract the end of the seat belt and locks it.

The above type of seat belt retracting power generating device is disclosed in Japanese patent Application Laid-open Print No. Hei 3-132447 for example.

This known seat belt retracting power generating device will be described with reference to FIG. 16 and FIG. 17. FIG. 16 shows a seat belt retracting power generating device, and FIG. 17 shows a gas generator for the seat belt retracting power generating device.

In these drawings, reference numeral 201 shows a housing for accommodating a gas generator 202.

The housing 201 is provided with a gas passage 203 for guiding the combustion gas generated from the gas generator 202.

The housing 201 has a cylinder 204 protruded from its one side substantially perpendicularly to its axial line.

Specifically, the cylinder 204 has a male thread 205 at its one end, the male thread 205 is threaded into a female thread 206 of the housing 201 to connect the cylinder 204 to the housing 201, and the opening of the cylinder 204 on the housing 201 side is communicated with the gas passage 203.

The cylinder 204 has a piston 207 in it, and the end of the piston 207 on the housing 201 side is connected to one end of a cable 208.

And, the cable 208 passes through a pail of the gas passage 203 and pulled out of the side opposite to the cylinder 204 of the housing 201.

The other end of the cable 208 is fixed to E t cable end 209 which is connected to an emergency retracting device (not shown).

The piston 207 has a seal ring 210 on the housing 201 side, and a cable sealing 211 is disposed to cover the cable 208.

A firing pin 213 is disposed next to (above in the drawing) a primer 212 of the gas generator 202. The firing pin 213 can stab the primer 212 by a given firing pin actuator 214.

FIG. 17 shows the gas generator 202 in detail. In the drawing, reference numeral 215 shows a casing.

The casing 215 has an open end 215A to provide a primer chamber 219, and another end 215B to provide a gas generating agent chamber 217 for accommodating an ignition agent and driving agent 216.

And, a sealing plate 218 is disposed in front of the gas generating agent chamber 217 and fixed to the casing 215 by caulking.

The primer chamber 219 accommodates the primer 212 which is fixed to the casing 215 by caulking. And the casing 215 has on its outer periphery a male thread 221 which is threaded into a female thread 220 of the housing 201.

And, the gas generating agent chamber 217 is communicated with the primer chamber 219 via a small-diameter passage 222.

When the primer 212 is activated, its flames are concentrated from the primer chamber 219 into the small-diameter passage 222 which has a cross-sectional area far smaller than that of the primer chamber 219, preventing the flames from concentrating into the small-diameter passage 222. Thus, the quality of heat to be supplied may be limited.

Therefore, ignition of the ignition agent in the gas generating agent chamber 217 is deteriorated, gas generation from the driving agent is delayed, and the rupture of the sealing plate 218 of the gas generating agent chamber 217 is delayed.

Consequently, time between the initial operation of the seat belt retractor and the retraction of the seat belt is delayed.

And, since the gas generating agent chamber 217 is communicated with the primer chamber 219 via the small-diameter passage 222, external humidity may enter the gas generating agent chamber 217 through a gap between the inner wall of the primer chamber 219 and the primer 212. Thus, the gas generating agent chamber 217 cannot be kept airtight, the ignition agent and driving agent 216 within the gas generating agent chamber 217 is damped due to external humidity, and ignition may not be made with reliability.

To prevent humidity from entering, a coating such as lacquer is applied between the inner periphery of the primer chamber 219 and the primer 212. But, when the primer 212 is housed in the primer chamber 219, the coating such as lacquer flows into the small-diameter passage 222 and clogs it. Thus, flames when the primer 212 is activated may not be transmitted into the gas generating agent chamber 217 with reliability.

And, a gap between the casing 215 and the sealing plate 218 may be sealed to prevent external humidity from entering. But, when this sealing is not made completely, humidity enters the gas generating agent chamber 217 through the gab between the female thread 220 of the housing 201 and the male thread 221 of the casing 215.

SUMMARY OF THE INVENTION

This invention has been completed to remedy the above problems, and aims to provide a gas generator for a seat belt retracting power generating device which can concentrate flames into a small-diameter passage when a primer is ignited and can supply heat quickly to a gas generating agent chamber.

Another object of the invention is to provide a gas generator for a seat belt retracting power generating device which can prevent an ignition agent and a driving agent within the gas generating agent chamber from being damped and can ignite the ignition agent and the driving agent with reliability.

This invention comprises a cylindrical casing with its one end open, a cylindrical holder chamber disposed at one end of the casing, a gas generating agent chamber which is communicated with the holder chamber via a shoulder formed on the inner wall of the casing and has a diameter smaller than the inner wall of the holder chamber, an ignition agent and a driving agent housed in the gas generating agent chamber, a primer holder which is housed in the holder chamber and has a primer chamber open toward one end of the casing, a caulking part which is formed at one end of the casing to hold the primer holder, a primer held within the primer chamber, and a small-diameter passage which is formed in the primer holder, communicates the gas generating agent chamber and the primer chamber, and has an inverted conical-shaped part having a tapered angle of 60 to 120 degrees formed at its end on the primer chamber side.

The invention is characterized in that a maximum diameter part of the inverted conical-shaped part is 0.2 to 0.3 mm smaller than an outer diameter of the primer.

The invention is also characterized in that the gas generating agent chamber has a V-groove on its bottom.

The invention comprises a cylindrical casing with its one end open, a cylindrical holder chamber disposed at one end of the casing, a gas generating agent chamber which is communicated with the holder chamber via a shoulder formed on the inner wall of the casing and has a diameter smaller than the inner wall of the holder chamber, an ignition agent and a driving agent housed in the gas generating agent chamber, a primer holder housed in the holder chamber, a primer chamber which is formed within the primer holder and has its one end open to the gas generating agent chamber, a primer held within the primer chamber, a small-diameter passage which is formed within the primer holder to communicate with the other end of the primer chamber and is open to one end of the casing, and a caulking part which is formed at one end of the casing to hold the primer holder.

The invention is characterized in that a sealing resin layer for covering the small-diameter passage is formed between the surface of the primer holder on the primer side and the caulking part of the casing.

The invention comprises a cylindrical casing with its one end open, a cylindrical holder chamber disposed at one end of the casing, a gas generating agent chamber which is communicated with the holder chamber via a shoulder formed on the inner wall of the casing and has a diameter smaller than the inner wall of the holder chamber, an ignition agent and a driving agent housed in the gas generating agent chamber, a primer holder which is housed in the holder chamber and has a primer chamber open toward one end of the casing, a caulking part which is formed at one end of the casing to hold the primer holder, a primer held within the primer chamber, a small-diameter passage which is formed in the primer holder and communicates the gas generating agent chamber and the primer chamber, a sealing resin layer which is applied between the surface of the primer holder on the primer side and the caulking part of the casing, and a first thin film material which is held between the surface of the primer holder opposite to the primer and the shoulder of the casing.

The invention is characterized in that a second thin film material for sealing one end of the small-diameter passage is held between the bottom face of the primer chamber and the primer.

The invention is characterized in that the first thin film material is a synthetic resin film.

The invention is characterized in that the first thin film material is prepared by applying a pressure sensitive adhesive to a synthetic resin film.

In the invention, when the firing pin hits the surface of the primer upon collision of an automobile to ignite the primer, flames are concentrated at the inverted conical-shaped part and lead into the small-diameter passage, heat is quickly supplied to the gas generating agent chamber, the ignition agent and the driving agent in the gas generating agent chamber are exploded, and gas is generated within the gas generating agent chamber.

And, the combustion gas from the ignition agent and the driving agent can be prevented from flowing back to the primer side.

In the invention, the primer does not drop into the inverted conical-shaped part of the small-diameter passage and is held within the primer chamber.

In the invention, the bottom of the gas generating agent chamber is broken due to the internal pressure of the gas generating agent chamber.

And, a distance between the primer and the gas generating agent chamber is decreased because one side of the primer chamber is open toward the gas generating agent chamber. Thus, flames from the activated primer directly enter the gas generating agent chamber, the flames have an accelerated inflammation rate. The ignition agent in the gas generating agent chamber is ignited by the flames, the driving agent is exploded and burnt, and gas is generated within the gas generating agent chamber.

Since the primer holder is caulked by the caulking part of the casing, the sealing resin layer is pushed by the caulking part against the face of the primer holder on the primer side.

Thus, the sealing resin layer prevents external humidity from entering the gas generating agent chamber, the gas generating agent chamber is kept in a sealed state, and the ignition agent and the driving agent within the gas generating agent chamber are prevented from being damped by external humidity.

In the invention, when the firing pin hits the surface of the primer upon collision of an automobile to ignite the primer, flames enter the gas generating agent chamber through the small-diameter passage, the ignition agent and the driving agent both in the gas generating agent chamber are exploded, and gas is generated within the gas generating agent chamber.

Since the primer holder is caulked by the caulking part of the casing, the sealing resin layer is pushed by the caulking part against the face of the primer holder on the primer side, and at the same time, the first thin film material is pushed against the shoulder by the surface of the primer holder opposite to the primer side.

Thus, the sealing resin layer and the first thin film material prevent external humidity from entering the gas generating agent chamber, the gas generating agent chamber is kept in a sealed state, and the ignition agent and the driving agent within the gas generating agent chamber are prevented from being damped by external humidity.

Since a second thin film material for closing one end of the small-diameter passage is held between the bottom of the primer chamber and the primer, humidity is prevented from entering the gas generating agent chamber from the primer chamber through the small-diameter passage.

In the invention, the first thin film material is made of a synthetic resin film, enabling to seal the gas generating agent chamber airtight.

In the invention, the first thin film, material is prepared by applying a pressure sensitive adhesive to a synthetic resin film, so that the gas generating agent chamber can be made airtight more securely.

BRIEF DESCRIPTION OF THE DRAWINGS

FIG. 13 is a sectional view of the primer holder shown in FIG. 12.

FIG. 14 is a sectional view of a primer holder, showing a relation between a tapered angle and a small-diameter passage length.

BEST MODE FOR CARRYING OUT THE INVENTION

The embodiments of the invention will be described with reference to the attached drawings.

Figure 1:
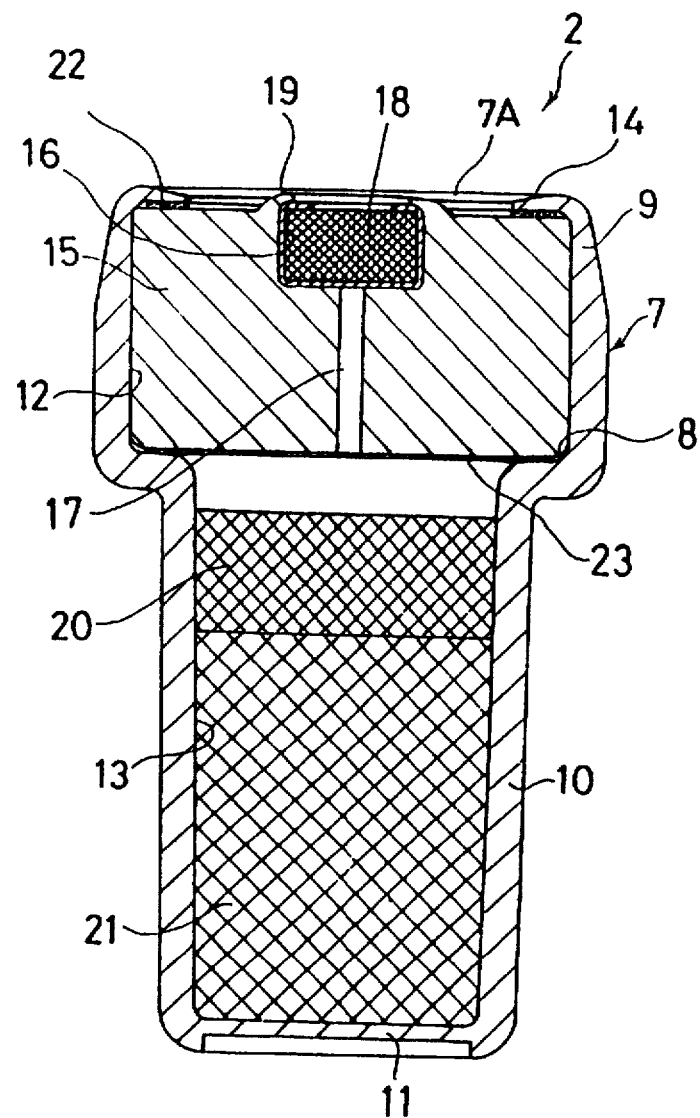
FIG. 1 is a sectional view of the essential part of a gas generator for a seat belt retracting power generating device according to the first embodiment of the invention.
Figure 2:
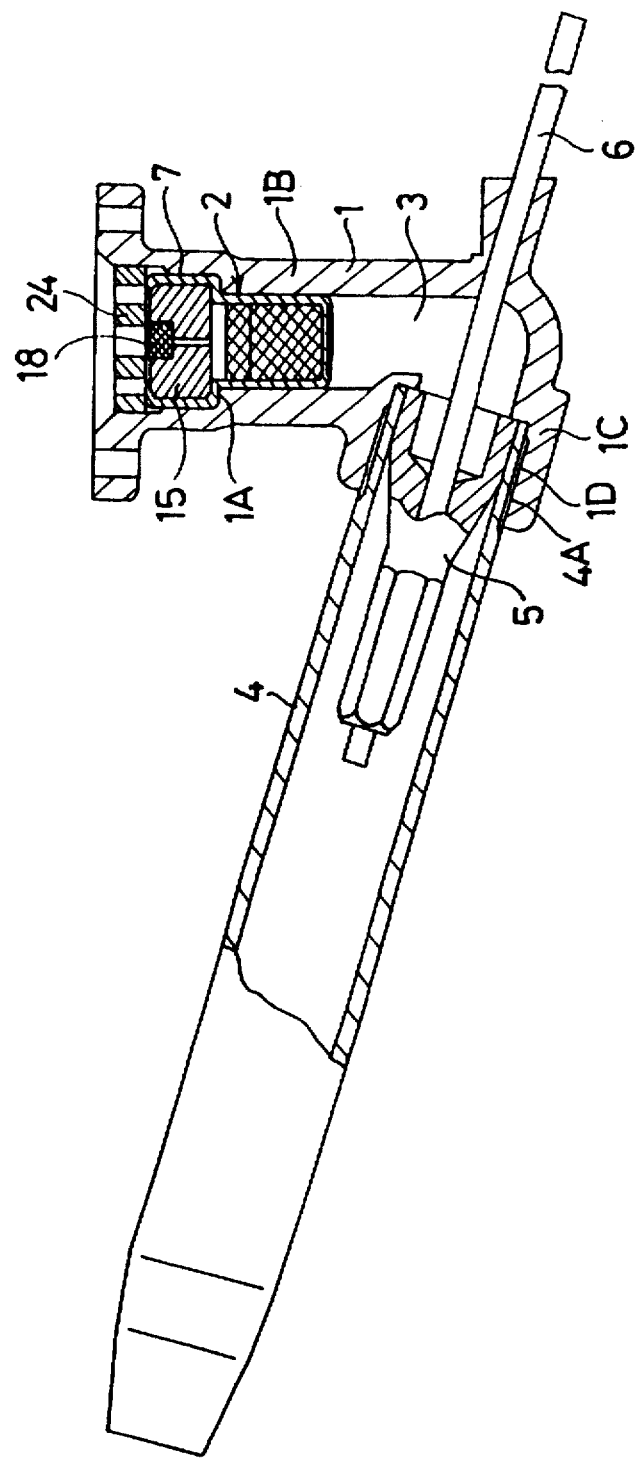
FIG. 2 is a sectional view of a seat belt retracting power generating device of the first embodiment.
Figure 3:
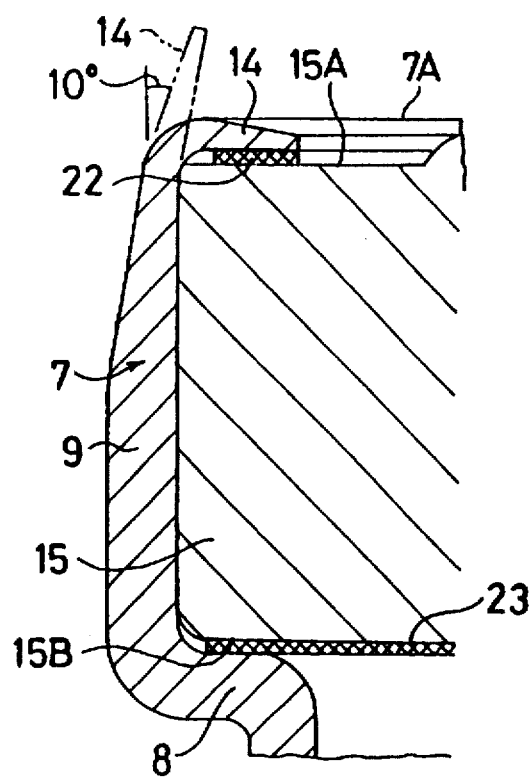
FIG. 3 is an enlarged view showing a sealing resin layer and a first thin film shown in FIG. 1.

FIG. 1 to FIG. 3 shows a gas generator for a seat belt retracting power generating device according to the first embodiment of the invention.

In FIG. 2, reference numeral 1 shows a manifold case for accommodating a gas generator 2. The manifold case 1 comprises a stepped cylindrical part 1B having a shoulder 1A, and a mount 1C which is integrally formed on the side of the stepped cylindrical part 1B to communicate with the stepped cylindrical part 1B in a slanting direction with respect to an axis of the stepped cylindrical part 1B.

The manifold case 1 has the gas generator 2 and a gas passage 3 for guiding combustion gas produced from the gas generator 2.

The manifold case 1 has a cylinder 4 protruded from the mount 1C. More specifically, a male thread 4A is formed on one end of the cylinder 4 and is threaded into a female thread 1D formed on the mount 1C of the manifold case 1, thereby connecting the cylinder 4 with the manifold case 1. And, the opening of the cylinder 4 on the manifold case 1 side is communicated with the gas passage 3.

The cylinder 4 accommodates a piston 5 whose end on the manifold case 1 side is connected with one end of a cable 6. The cable 6 is passed through a part of the gas passage 3 and pulled out of the side opposite to the cylinder 4 of the manifold case 1.

FIG. 1 and FIG. 3 show the gas generator 2 in detail, where reference numeral 7 designates a casing.

The casing 7 is made of aluminum (e.g., JIS A 5052) which excels in corrosion resistance, has a bottom-closed cylindrical shape and a shoulder 8 on its inner wall. The casing 7 has a large diameter part 9 and a cylindrical small-diameter part 10 which is continuous from and communicated with the large diameter part 9 via the shoulder 8.

The large diameter part 9 has a cylindrical holder chamber 12, the small-diameter part 10 has a gas generating agent chamber 13 which is continuous from the holder chamber 12, and the gas generating agent chamber 13 has a diameter smaller than the inner wall of the holder chamber 12.

The small-diameter part 10 is integrally closed by a bottom 11 which is thin and breakable, allowing gas produced, when an ignition agent 20 and a driving agent 21 are exploded, to pass through it and to enter the gas passage 3.

The large diameter part 9 of the casing 7 has an opening 7A and an annular caulking part 14 on its periphery.

The holder chamber 12 accommodates a primer holder 15 which is made of, e.g., sulfur free-cutting steel (SUM: steel use machinerbility) and has a primer chamber 16. The primer chamber 16 is open toward one side of the casing 7. The primer holder 15 is caulked by the caulking part 14 so as to be fixed within the holder chamber 12. And, FIG. 3 shows that the caulking part 14 of the casing 7 is angled inward at about 10 degrees with respect to an axis of the casing 7 as indicated by a two-dot chain line until the casing 7 is caulked. Thus, caulking can be facilitated. The caulking part 14 indicated by the two-dot chain line is pressed into a state indicated by a solid line.

The primer holder 15 has a small-diameter passage 17 which communicates the gas generating agent chamber 13 and the primer chamber 16. The primer chamber 16 accommodates a primer 18.

The gas generating agent chamber 13 accommodates the ignition agent 20 and the driving agent 21. The ignition agent 20 is boron-based potassium nitrate. The driving agent 21 is a single base propellant which comprises cellulose nitrate, diphenylamine, potassium nitrate and graphite.

The small-diameter passage 17 has a diameter of 0.5 to 1.2 mm and an overall length 5 to 8 times larger than the diameter. Thus, the combustion gas from the ignition agent 20 and the driving agent 21 can be prevented from flowing back toward the primer 18.

The primer 18 is caulked within the primer chamber 16 by a pressure part 19 which is formed at the periphery of the opening of the primer chamber 16. The gunpowder in the primer 18 contains 0.5 to 10% by weight of tetracene.

And, a sealing resin layer 22 is held between a surface 15A of the primer holder 15 on the primer side and the caulking part 14 of the casing 7. A sealing resin in a gel state which forms the sealing resin layer 22 is previously applied to the surface 15A of the primer holder 15 on the primer side before caulking by the caulking part 14 of the casing 7. For example, the sealing resin layer 22 is formed by applying and hardening about 10 to 50 mg of silicone resin before forming the caulking part 14. The silicone resin has good visco-elasticity and forms extensive coating without any interruption both in the applied gel state and in the hardened state, providing reliable sealing properties.

A first thin film material 23 is held between a surface 15B of the primer holder 15 opposite to the primer side and the shoulder 8 of the casing 7. The first thin film material 23 has a thickness of 50 μm and a disc shape, and is prepared by applying a pressure sensitive adhesive to a thickness of 20 to 30 μm onto a synthetic resin film which is a polyester film or polyimide film.

FIG. 2 shows that the gas generator 2 is fixed within the manifold case 1 by a cap 24.

A firing pin (not shown) is disposed next to (above in FIG. 2) the cap 24, and the firing pin can stab the primer 18 by a given firing pin actuator.

In the gas generator for the seat belt retracting power generating device structured as described above, the firing pin actuator activates upon collision of an automobile to stab the firing pin into the surface of the primer 18 to ignite the primer 18, flames pass through the small-diameter passage 17 to enter the gas generating agent chamber 13, and the ignition agent 20 in the gas generating agent chamber 13 is ignited and burnt.

Then, the bottom 11 of the casing 7 is broken by the above combustion, combustion gas passes through the gas passage 3 to enter the cylinder 4, the piston 5 in the cylinder 4 is moved, the cable 6 whose one end is connected to the piston 5 is moved to activate the emergency retracting device, and the seat belt is instantaneously retracted by the activation of the emergency retracting device.

Since the primer holder 15 is caulked by the caulking part 14 of the casing 7, the sealing resin layer 22 is pushed by the caulking part 14 against the face 15A of the primer holder 15 on the primer side, and at the same time, the first thin film material 23 is pushed against the shoulder 8 by the surface 15B of the primer holder 15 opposite to the primer side. And, the sealing resin layer 22 and the first thin film material 23 are held within the large diameter part 9 of the casing 7.

Thus, the sealing resin layer 22 and the first thin film material 23 prevent external humidity from entering the gas generating agent chamber 13, the gas generating agent chamber 13 is kept in a sealed state, and the ignition agent 20 and the driving agent 21 within the gas generating agent chamber 13 are prevented from being damped by external humidity. The gas generating agent chamber 13 has an internal pressure of $10^{-3}$ atom/ml.

Owing to the above structure, the sealing resin layer 22 and the first thin film material 23 prevent external humidity from entering the gas generating agent chamber 13, so that the gas generating agent chamber 13 can be kept in an airtight condition. Thus, external humidity is prevented from damping the ignition agent 20 and the driving agent 21 within the gas generating agent chamber 13, and the ignition agent 20 and the driving agent 21 can be ignited with reliability.

Utilizing a force for caulking the primer holder 15 by the caulking part 14 of the casing 7, the sealing resin layer 22 can be held airtight between the surface 15A of the primer holder 15 on the primer side and the caulking part 14 of the casing, and the first thin film material 23 can be held airtight between the surface 15B of the primer holder 15 opposite to the primer side and the shoulder 8 of the casing 7. Thus, the gas generating agent chamber 13 can be kept airtight, eliminating the necessity of mounting an O-ring which is generally used as a sealing member.

When caulking by the caulking part 14 of the casing 7, the sealing resin in a gel state which forms the sealing resin layer 22 is previously applied to the surface 15A of the primer holder 15 on the primer side, so that the sealing resin layer 22 conforms to the shape of the caulking part 14, providing reliable sealing properties.

Since the first thin film material 23 is prepared by applying a pressure sensitive adhesive to a synthetic resin film, the first thin film material 23 can be positioned reliably and the gas generating agent chamber 13 can be made airtight securely.

Figure 16:
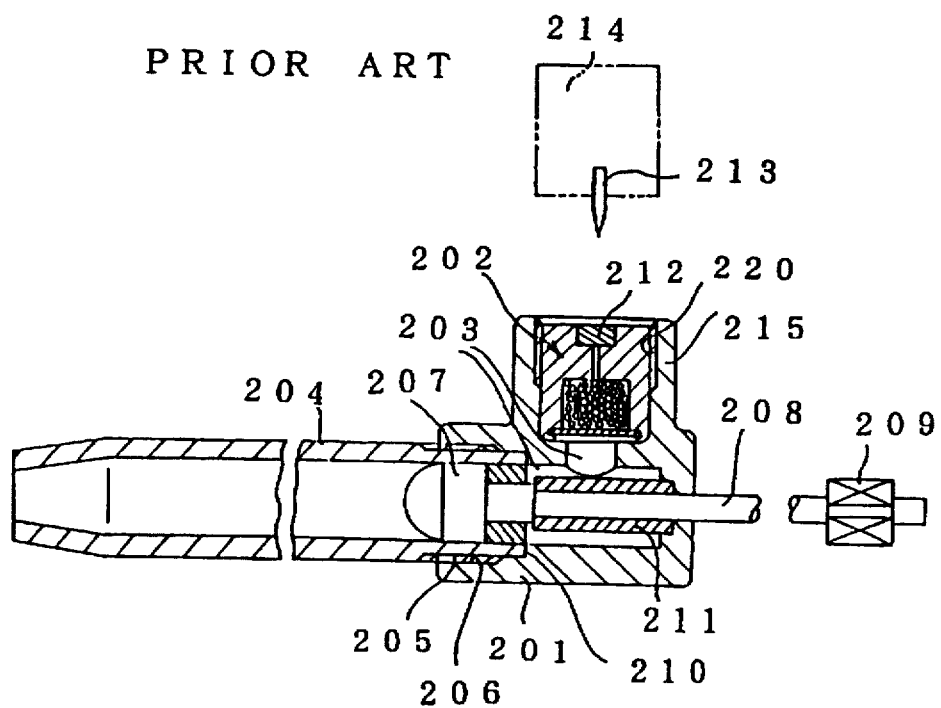
FIG. 16 is a sectional view of a conventional seat belt retracting power generating device.
Figure 17:
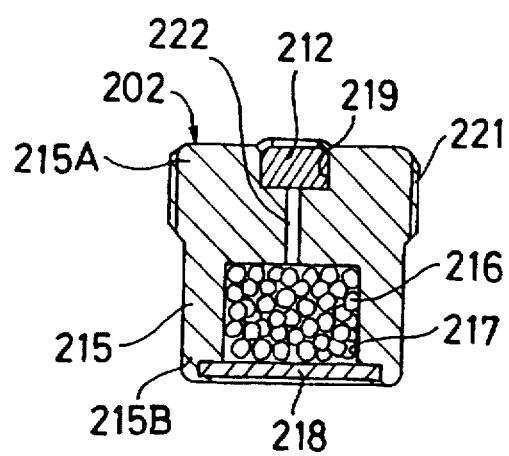
FIG. 17 is a sectional view of a gas generator for a conventional seat belt retracting power generating device.

In case of the entry of humidity through a gap between the manifold case 1 and the outer periphery of the casing 7, humidity is prevented from entering the gas generating agent chamber 13 by the bottom 11 which is integrally formed with the small-diameter part 10 of the casing 7 to close it. Thus, the casing 7 is completely sealed, while the conventional device (FIG. 16 and FIG. 17) has a possibility that external humidity which has entered through a gap between the female thread 220 of the housing 201 and the male thread 221 of the casing 215 may enter the gas generating agent chamber 217 through a gap between the casing 215 and the sealing plate 218.

In the embodiment of the invention, a second thin film material, which is made of a synthetic resin film for sealing one end of the small-diameter passage 17, may be held between the bottom of the primer chamber 16 and the primer 18. Thus, humidity is prevented from entering the gas generating agent chamber 13 from the primer chamber 16 through the small-diameter passage 17, enabling to enhance the reliability of ignition. In this case, the second thin film material is prepared by applying a pressure sensitive adhesive to a synthetic resin film to provide a more reliable sealed condition for the gas generating agent chamber 13.

And, although the first thin film material 23 is prepared by applying a pressure sensitive adhesive to a synthetic resin film in this embodiment, it may be prepared using a synthetic resin film only, and the gas generating agent chamber 13 can be sealed airtight.

The first thin film material 23 in this embodiment has a thickness of 50 μm and its synthetic resin film has a thickness of 20 to 30 μm but these thicknesses are not limited to these values.

This embodiment uses a polyester film or polyimide film for the synthetic resin film, but other materials may be used.

And, this embodiment uses silicone resin for tie sealing resin layer, but other materials may be used.

Figure 4:
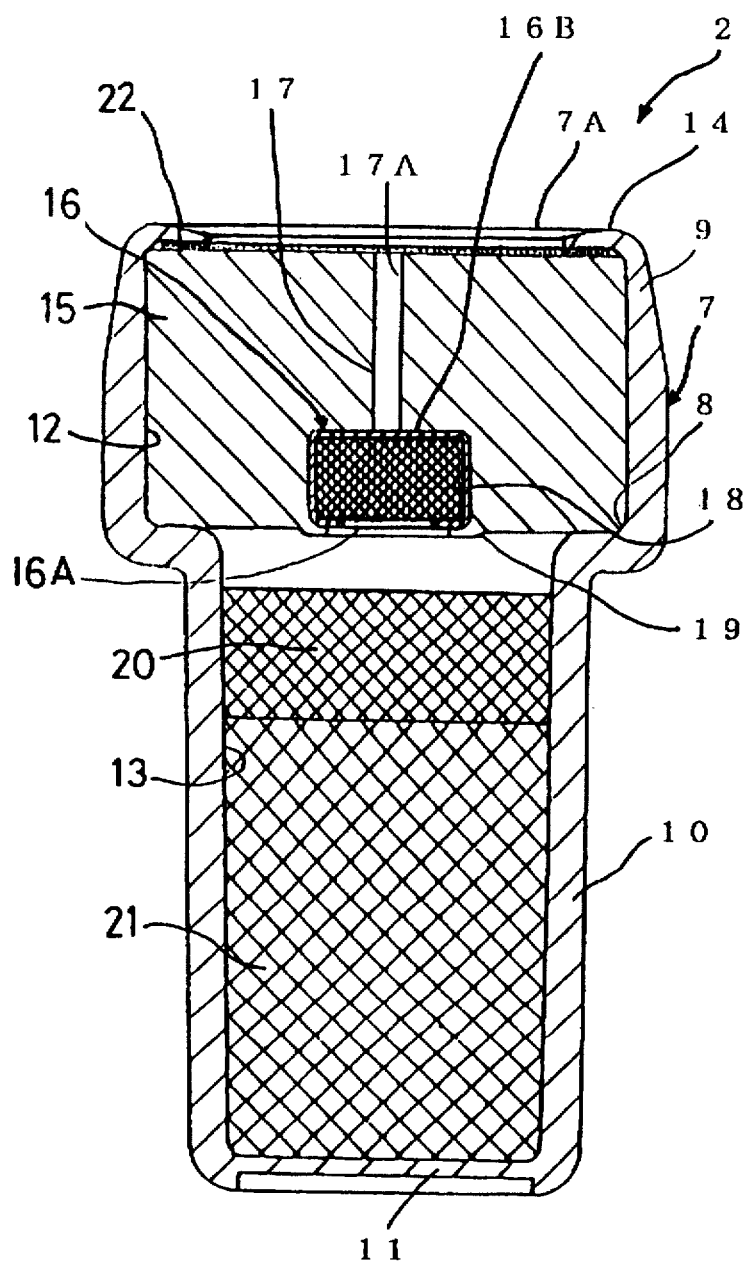
FIG. 4 is a sectional view of the essential part of a gas generator for a seat belt retracting power generating device according to the second embodiment of the invention.
Figure 5:
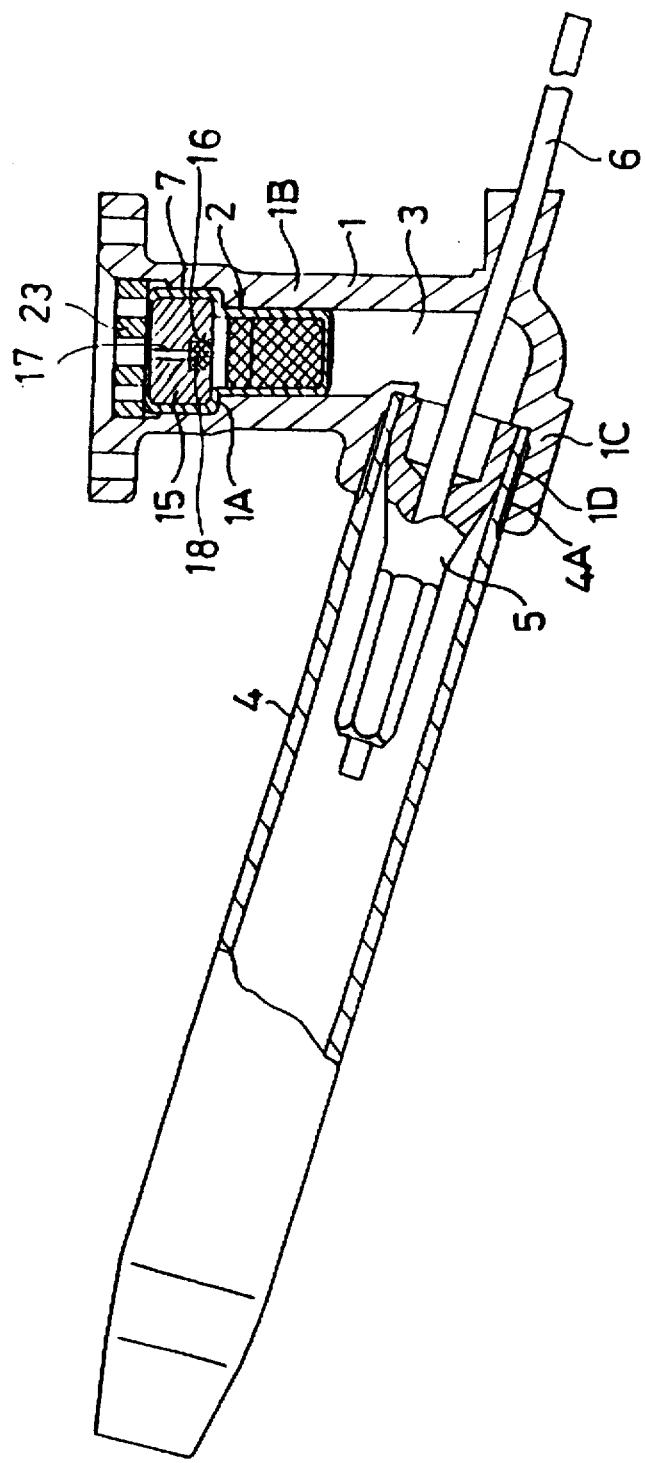
FIG. 5 is a sectional view of a seat belt retracting power generating device of the second embodiment.
Figure 6:
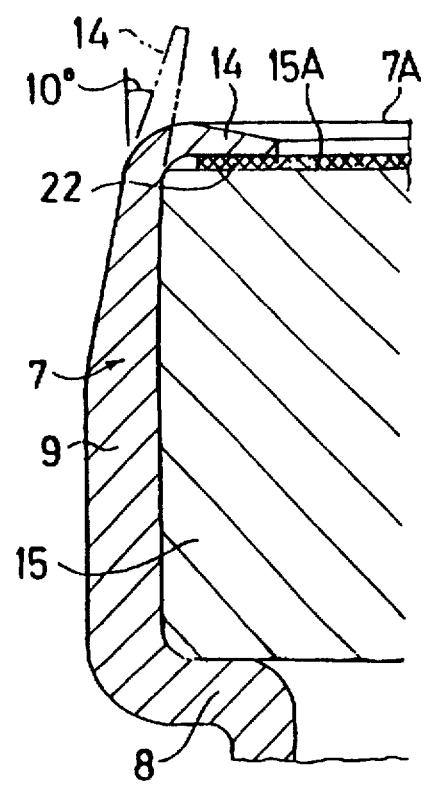
FIG. 6 is an enlarged view showing a sealing resin layer shown in FIG. 4.

FIG. 4 to FIG. 6 show a seat belt retracting power generating device according to the second embodiment of the invention.

This embodiment disposes the primer 18 shown in FIG. 1 on the gas generating agent chamber 13 side of the primer holder 15. The same members as those shown in FIG. 1 are given the same reference numerals for description.

The holder chamber 12 accommodates the primer holder 15 which is made of sulfur free-cutting steel (SUM: steel use machinerbility). The primer holder 15 is caulked by the caulking part 14 so as to be fixed within the holder chamber 12.

FIG. 6 shows that the caulking part 14 of the casing 7 is angled inward at about 10 degrees with respect to an axis of the casing 7 as indicated by a two-dot chain line until the casing 7 is caulked. Thus, caulking can be facilitated. The caulking part 14 indicated by the two-dot chain line is pressed into a state indicated by a solid line.

The primer holder 15 has the primer chamber 16, and one side 16A of the primer chamber 16 is open toward the gas generating agent chamber 13.

The primer holder 15 has a small-diameter passage 17 which is communicated with other side 16B of the primer chamber 16, and the small-diameter passage 17 is open toward an opening 7A of the cylindrical casing 7. And, the primer chamber 16 accommodates a primer 18.

The small-diameter passage 17 has a diameter of 0.5 to 1.2 mm and an overall length 5 to 8 times larger than the diameter.

The primer 18 is caulked within the primer chamber 16 by a pressure part 19 of the primer holder 15. The gunpowder in the primer 18 contains 0.5 to 10% by weight of tetracene.

The gas generating agent chamber 13 accommodates the ignition agent 20 and the driving agent 21. The ignition agent 20 is boron-based potassium nitrate. The driving agent 21 is a single base propellant which comprises cellulose nitrate, diphenylamine, potassium nitrate and graphite.

And, a sealing resin layer 22 is held between a surface 15A of the primer holder 15 on the primer side and the caulking part 14 of the casing 7. The sealing resin layer 22 covers an entrance 17A of the small-diameter passage 17.

A sealing resin in a gel state which forms the sealing resin layer 22 is previously applied to the surface 15A of the primer holder 15 on the primer side before caulking by the caulking part 14 of the casing 7. For example, the sealing resin layer 22 is formed by applying and hardening about 10 to 50 mg of silicone resin before forming the caulking part 14. The silicone resin has good visco-elasticity and forms extensive coating without any interruption both in the applied gel state and in the hardened state, providing reliable sealing properties.

FIG. 5 shows that the gas generator 2 is fixed within the manifold case 1 by a cap 23.

A firing pin (not shown) is disposed next to (above in FIG. 5) the cap 23, and the firing pin can stab the primer 18 by a given firing pin actuator.

In the gas generator 2 for the seat belt retracting power generating device structured as described above, the firing pin actuator activates upon collision of an automobile to stab the firing pin into the surface of the primer 18 to ignite the primer 18.

Since the side 16A of the primer chamber 16 is open toward the gas generating agent chamber 13, a distance between the primer 18 and the gas generating agent chamber 13 is short, flame from the activated primer 18 directly enter the gas generating agent chamber 13, accelerating an inflammation rate. The ignition agent 20 in the gas generating agent chamber 13 is ignited by flames, the driving agent 21 is explosively burnt, and gas is produced within the gas generating agent chamber 13.

Then, the bottom 11 of the casing 7 is broken by the above explosive combustion, combustion gas passes through the gas passage 3 to enter the cylinder 4, the piston 5 in the cylinder 4 is moved, the cable 6 whose one end is connected to the piston 5 is moved to activate the emergency retracting device, and the seat belt is instantaneously retracted by the activation of the emergency retracting device.

Since the primer holder 15 is caulked by the caulking part 14 of the casing 7, the sealing resin layer 22 is pushed by the caulking part 14 against the face 15A of the primer holder 15 on the primer side. And, the sealing resin layer 22 is held within the large diameter part 9 of the casing 7.

Thus, the sealing resin layer 22 prevents external humidity from entering the gas generating agent chamber 13, the gas generating agent chamber 13 is kept in a sealed state, and the ignition agent 20 and the driving agent 21 within the gas generating agent chamber 13 are prevented from being damped by external humidity. The gas generating agent chamber 13 has an internal pressure of $10^{-3}$ atom/mL.

Owing to the above structure, since the side 16A of the primer chamber 16 is open toward the gas generating agent chamber 13, a distance between the primer 18 and the gas generating agent chamber 13 is short. And, flames from the activated primer 18 directly enter the gas generating agent chamber 13, an inflammation rate is accelerated, and the ignition agent 20 and the driving agent 21 can be ignited quickly.

And, the sealing resin layer 22 prevents external humidity from entering the gas generating agent chamber 13, so that the gas generating agent chamber 13 can be kept in an airtight condition. Thus, external humidity is prevented from damping the ignition agent 20 and the driving agent 21 within the gas generating agent chamber 13, and the ignition agent 20 and the driving agent 21 can be ignited with reliability.

Utilizing a force for caulking the primer holder 15 by the caulking part 14 of the casing 7, the sealing resin layer 22 can be held airtight between the surface 15A of the primer holder 15 on the primer side and the caulking part 14 of the casing 7. Thus, the gas generating agent chamber 13 can be kept airtight, eliminating the necessity of mounting an 0-ring which is generally used as a sealing member.

When caulking by the caulking part 14 of the casing 7, the sealing resin in a gel state which forms the sealing resin layer 22 is previously applied to the surface 15A of the primer holder 15 on the primer side, so that the sealing resin layer 22 conforms to the shape of the caulking part 14, providing reliable sealing properties.

In case of the entry of humidity through a gap between the manifold case 1 and the outer periphery of the casing 7, humidity is prevented from entering the gas generating agent chamber 13 by the bottom 11 which is integrally formed with the small-diameter part 10 of the casing 7 to close it. Thus, the casing 7 is completely sealed, while the conventional device (FIG. 5 and FIG. 6) has a possibility that external humidity which has entered through a gap between the female thread 220 of the housing 201 and the male thread 221 of the casing 215 may enter the gas generating agent chamber 217 through a gap between the casing 215 and the sealing plate 218.

Figure 7:
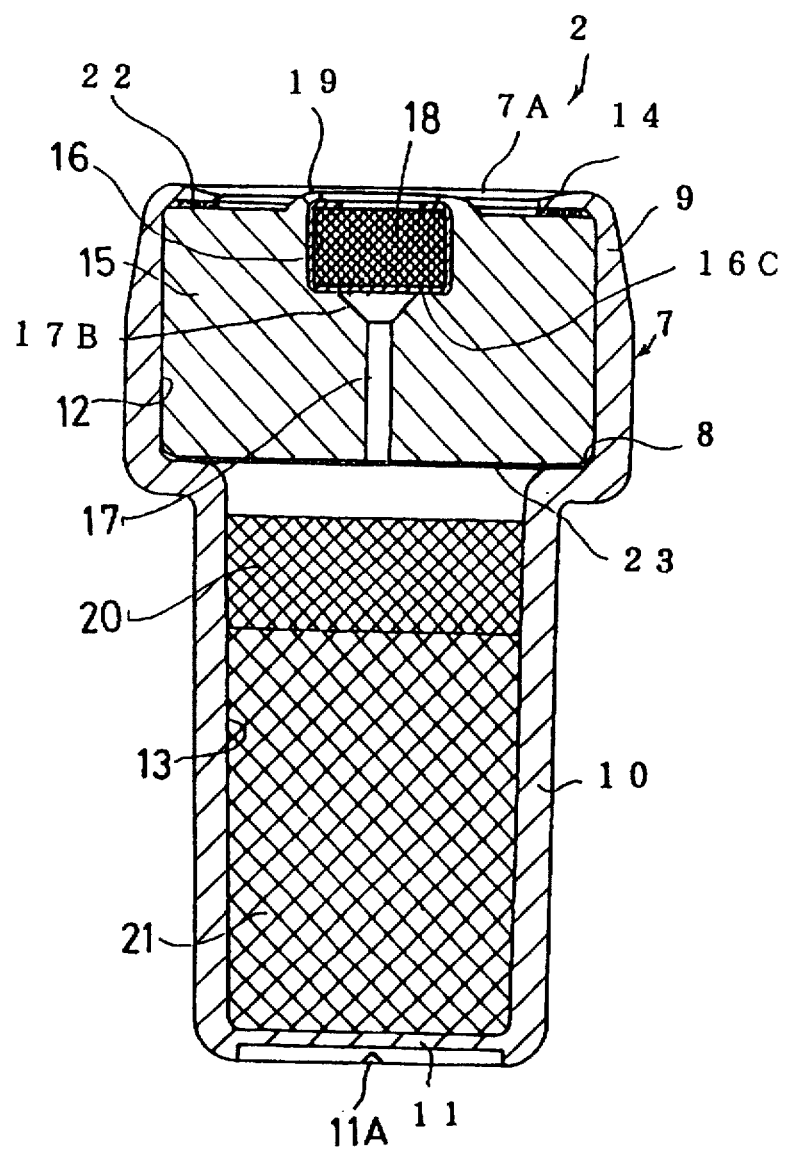
FIG. 7 is a sectional view of the essential part of a gas generator for a seat belt retracting power generating device according to the third embodiment of the invention.
Figure 8:
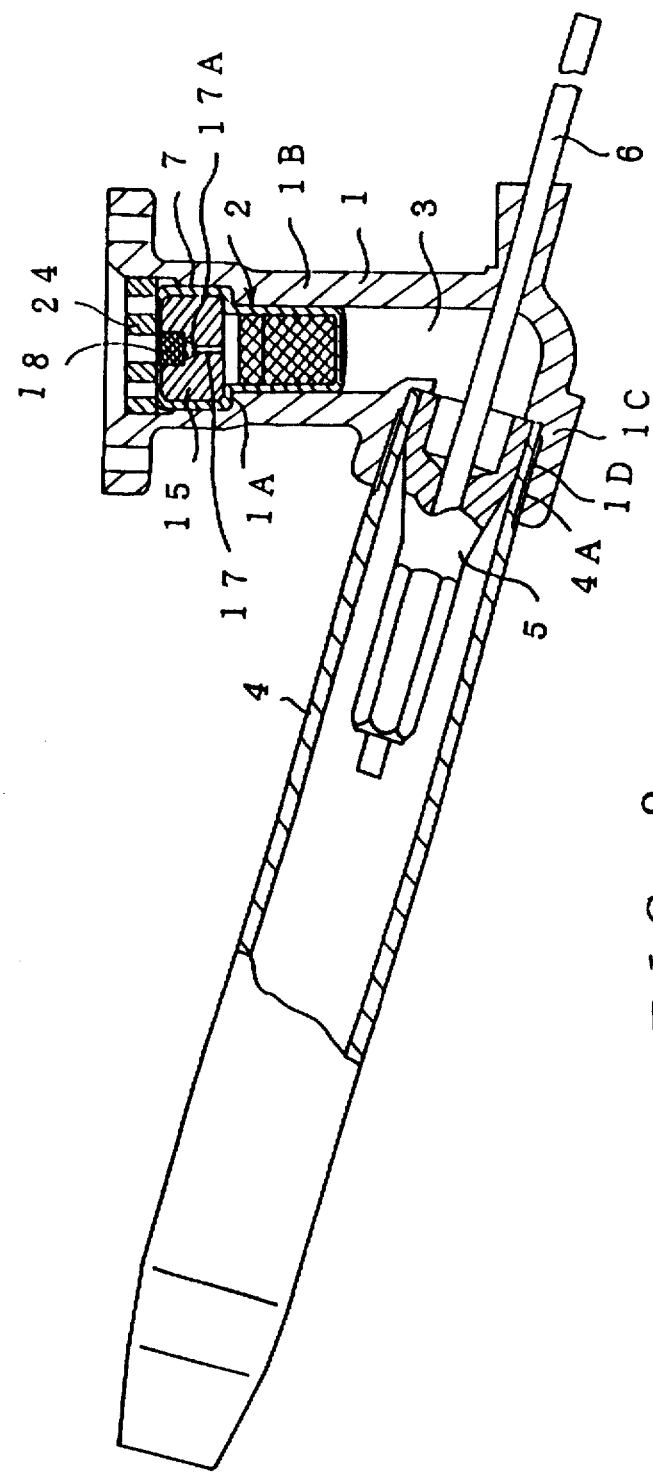
FIG. 8 is a sectional view of a seat belt retracting power generating device of the third embodiment.
Figure 9:
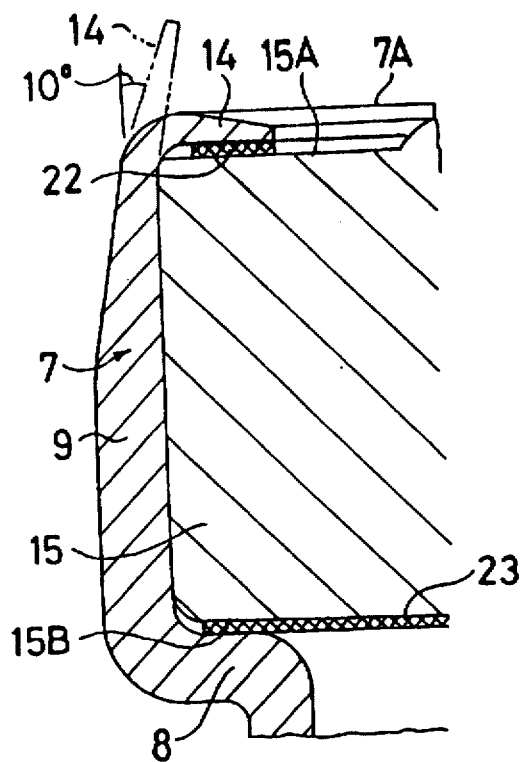
FIG. 9 is an enlarged view showing a sealing resin layer and a first thin film shown in FIG. 7.

FIG. 7 to FIG. 9 show a seat belt retracting power generating device according to the third embodiment of the invention.

This embodiment disposes an inverted conical-shaped part 17B between the small-diameter passage 17 and the bottom of the primer chamber 16 of the first embodiment. Therefore, The same members as those shown in FIG. 1 are given the same reference numerals for description.

The primer holder 15 has a small-diameter passage 17 which communicates the gas generating agent chamber 13 and the primer chamber 16. And, the primer chamber 16 accommodates a primer 18.

The gas generating agent chamber 13 accommodates the ignition agent 20 and the driving agent 21. The ignition agent 20 is boron-based potassium nitrate. The driving agent 21 is a single base propellant which comprises cellulose nitrate, diphenylamine, potassium nitrate and graphite.

The small-diameter passage 17 has a diameter of 0.5 to 1.2 mm and an overall length 5 to 8 times larger than the diameter. Thus, combustion gas from the ignition agent 20 and the driving agent 21 can be prevented from being ejected back toward the primer 18.

The small-diameter passage 17 has at its end on the primer chamber 16 side the inverted conical-shaped part 17B having a taper angle of 60 to 120 angles.

Figure 12:
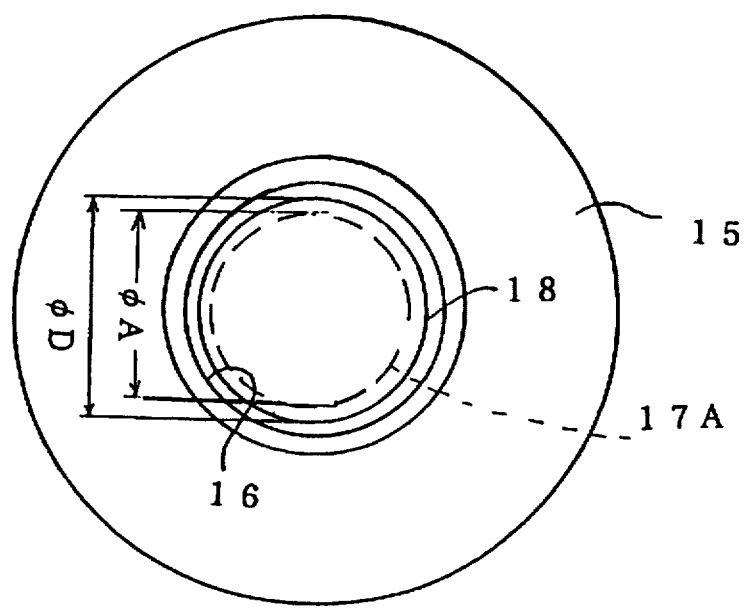
FIG. 12 is a plan view of a primer holder, showing a relation between a primer and an inverted conical-shaped part.
Figure 15:
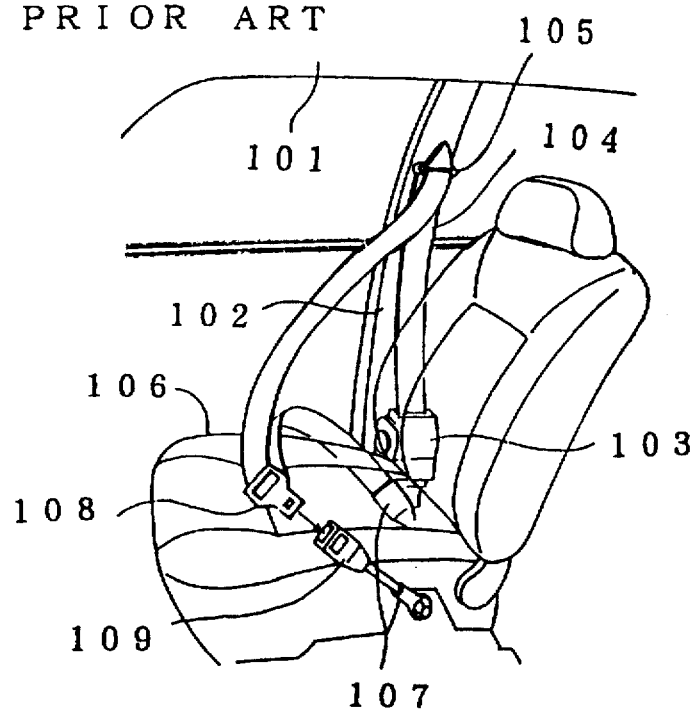
FIG. 15 is a perspective view showing a fastening state of a conventional seat belt.

FIG. 12 and FIG. 13 show that a maximum diameter part 17B of the inverted conical-shaped part 17B has a diameter φA which is about 0.2 to 0.3 mm smaller than a diameter D of the primer 18. The inverted conical-shaped part 17B of the small-diameter passage 17 will be described in detail.

Figure 10:
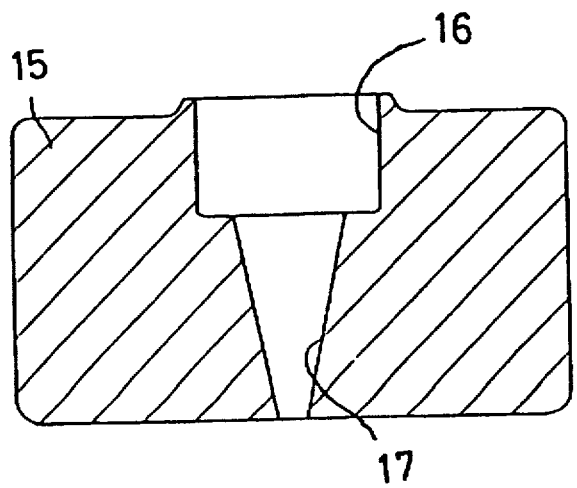
FIG. 10 is a sectional view of a primer holder in which a tapered part is formed to reach the bottom of a small-diameter passage.

FIG. 10 shows that the small-diameter passage 17 is tapered to its full length.

In this case, when the ignition agent 20 and the driving agent 21 are burnt within the gas generating agent chamber 13, the small-diameter passage 17 is broken due to thermal shock at the bottom and produced gas is ejected backward. Thus, the internal pressure of the gas generating agent chamber 13 can not be kept, and it may take a long time to break a V-groove 11A of the bottom 11.

Figure 11:
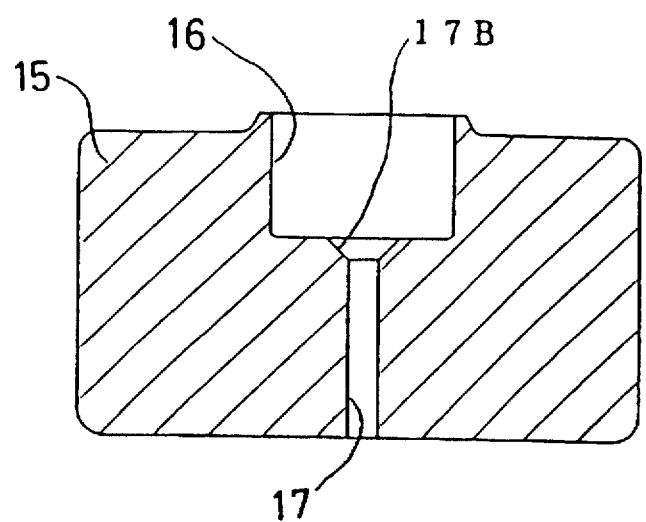
FIG. 11 is a sectional view of a primer holder in which the top of a small-diameter passage is chamfered to a level of C1 or below.

FIG. 11 shows that the small-diameter passage 17 is provided with the chamfering 17B of a level of C1 or below at its end on the primer chamber 16 side.

Chamfering to a level of C1 or below cannot lead the flame from the primer 18 into the small-diameter passage 17, providing no significant difference from a conventional small-diameter passage.

FIG. 12 and FIG. 13 show a relation between the primer 18 and the inverted conical-shaped part 17B.

To hold the primer 18 in the primer chamber 16, a bottom face 16C of the primer chamber 16 and a bottom face 18B of the primer 18 are required to contact horizontally because a surface 18A to be stubbed of the primer 18 is required to be vertical with respect to the direction that the firing pin stubs to avoid misfire.

Since a tapered angle of the inverted conical-shaped part 17B depends on the shape of the primer 18 used and the shape of the primer chamber 16, an optimum range of tapered angles is required to provide an inverted conical-shaped part which prevents a reverse shooting and has an effect of concentrating flames.

FIG. 14 shows a relation between tapered angles θ of the inverted conical-shaped part 17B of the small-diameter passage 17 and a small-diameter passage length L in this embodiment.

When the tapered angle θ is less than 60 degrees, the length L of the small-diameter passage 17 becomes short, gas is reversely jetted from the gas generating agent chamber 13, the internal pressure of the gas generating agent chamber 13 is not kept, and it may take a long time to break the V-groove 11A of the bottom 11.

On the other hand, when the tapered angle θ exceeds 120 degrees, it becomes close to chamfering of C1, so that flames are difficult to concentrate into the small-diameter passage 17.

In view of above, the tapered angle θ of the inverted conical-shaped part 17B is required to fall in a range of 60 to 120 degrees.

A length L1 of the small-diameter passage 17 with a tapered angle θ 1=60 degrees, a length L2 of the small-diameter passage 17 with a tapered angle θ 2=90 degrees, and a length L3 of the small-diameter passage 17 with a tapered angle θ 3=120 degrees are 5 to 8 times larger than the diameter of the small-diameter passage 17. Thus, the combustion gas from the ignition agent 20 and the driving agent 21 can be prevented from flowing back to the primer 18.

The primer 18 is caulked within the primer chamber 16 by a pressure part 19 formed at the periphery of the opening of the primer chamber 16. The gunpowder in the primer 18 contains 0.5 to 10% by weight of tetracene.

And, FIG. 9 shows that a sealing resin layer 22 is held between a surface 15A of the primer holder 15 on the primer side and the caulking part 14 of the casing 7. A sealing resin in a gel state which forms the sealing resin layer 22 is previously applied to the surface 15A of the primer holder 15 on the primer side before caulking by the caulking part 14 of the casing 7. For example, the sealing resin layer 22 is formed by applying and hardening about 10 to 50 mg of silicone resin before forming the caulking part 14. The silicone resin has good visco-elasticity and forms extensive coating without any interruption both in the applied gel state and in the hardened state, providing reliable sealing properties.

A first thin film material 23 is held between a surface 15B of the primer holder 15 opposite to the primer side and the shoulder 8 of the casing 7. The first thin film material 23 has a thickness of 50 μm and a disc shape, and is prepared by applying a pressure sensitive adhesive to thickness of 20 to 30 μm onto a synthetic resin film which is a polyester film or polyimide film.

FIG. 8 shows that the gas generator 2 is fixed within the manifold case 1 by a cap 24.

A firing pin (not shown) is disposed next to (above in FIG. 8) the cap 24, and the firing pin can stab the primer 18 by a given firing pin actuator.

The action of this embodiment will be described.

The firing pin actuator activates upon collision of an automobile to stab the firing pin into the surface of the primer 18 to ignite the primer 18, flames are concentrated at the inverted conical-shaped part 17B of the small-diameter passage 17 and lead into the small-diameter passage 17, heat is quickly supplied to the gas generating agent chamber 13, and the ignition agent 20 in the gas generating agent chamber 13 is ignited and burnt.

Then, the V-groove 11a on the bottom 11 of the casing 7 is broken by the above combustion, combustion gas passes through the gas passage 3 to enter the cylinder 4, the piston 5 in the cylinder 4 is moved, the cable 6 whose one end is connected to the piston 5 is moved to activate the emergency retracting device, and the seat belt is instantaneously retracted by the activation of the emergency retracting device.

Since the primer holder 15 is caulked by the caulking part 14 of the casing 7, the sealing resin layer 22 is pushed by the caulking part 14 against the face 15A of the primer holder 15 on the primer side, and at the same time, the first thin film material 23 is pushed against the shoulder 8 by the surface 15B of the primer holder 15 opposite to the primer side. And, the sealing resin layer 22 and the first thin film material 23 are held within the large diameter part 9 of the casing 7.

Thus, the sealing resin layer 22 and the first thin film material 23 prevent external humidity from entering the gas generating agent chamber 13, the gas generating agent chamber 13 is kept in a sealed state, and the ignition agent 20 and the driving agent 21 within the gas generating agent chamber 13 are prevented from being damped by external humidity. The gas generating agent chamber 13 has an internal pressure of $10^{-3}$ atom/ml.

Owing to the above structure, flames from the activated primer 18 are concentrated into the inverted conical-shaped part 17B having a tapered angle of 60 to 120 degrees formed at the end of the small-diameter passage 17 communicated with the bottom face of the primer chamber 16 to accelerate the supply of heat into the gas generating agent chamber 13.

And, the primer 18 does not drop into the inverted conical-shaped part 17B and can be kept horizontal with respect to the bottom face 16C of the primer chamber 16 even when the inverted conical-shaped part 17B is disposed at the bottom face 16C of the primer chamber 16.

In this embodiment, the sealing resin layer 22 and the first thin film material 23 prevent external humidity from entering the gas generating agent chamber 13, and the gas generating agent chamber 13 can be kept in a sealed state. Thus, the ignition agent 20 and the driving agent 21 within the gas generating agent chamber 13 are prevented from being damped by external humidity and can be ignited reliably.

Utilizing a force for caulking the primer holder 15 by the caulking part 14 of the casing 7, the sealing resin layer 22 can be held airtight between the surface 15A of the primer holder 15 on the primer side and the caulking part 14 of the casing 7. And, the first thin film material 23 is held between the surface 15B of the primer holder 15 opposite to the primer side and the shoulder 8 of the casing 7. Thus, the gas generating agent chamber 13 can be kept airtight, eliminating the necessity of mounting an O-ring which is generally used as a sealing member.

When caulking by the caulking part 14 of the casing 7, the sealing resin in a gel state which forms the sealing resin layer 22 is previously applied to the surface 15A of the primer holder 15 on the primer side, so that the sealing resin layer 22 conforms to the shape of the caulking part 14, providing reliable sealing properties.

Since the first thin film material 23 is prepared by applying a pressure sensitive adhesive to a synthetic resin film, the first thin film material 23 can be positioned reliably and the gas generating agent chamber 13 can be made airtight securely.

In case of the entry of humidity through a gap between the manifold case 1 and the outer periphery of the casing 7, humidity is prevented from entering the gas generating agent chamber 13 by the bottom 11 which is integrally formed with the small-diameter part 10 of the casing 7 to close it. Thus, the casing 7 is completely sealed, while the conventional device (FIG. 16 and FIG. 17) has a possibility that external humidity which has entered through a gap between the female thread 220 of the housing 201 and the male thread 221 of the casing 215 may enter the gas generating agent chamber 217 through a gap between the casing 215 and the sealing plate 218.

In this embodiment, a second thin film material, which is made of a synthetic resin film for sealing one end of the small-diameter passage 17, may be held between the bottom of the primer chamber 16 and the primer 18. Thus, humidity is prevented from entering the gas generating agent chamber 13 from the primer chamber 16 through the small-diameter passage 17, enabling to enhance the reliability of ignition. In this case, the second thin film material is prepared by applying a pressure sensitive adhesive to a synthetic resin film to provide a more reliable sealed condition for the gas generating agent chamber 13.

And, although the first thin film material 23 is prepared by applying a pressure sensitive adhesive to a synthetic resin film in this embodiment, it may be prepared using a synthetic resin film only, and the gas generating agent chamber 13 can be sealed airtight.

The first thin film material 23 in this embodiment has a thickness of 50 μm and its synthetic resin film has a thickness of 20 to 30 μm, but these thicknesses are not limited to these values.

This embodiment uses a polyester film or polyimide film for the synthetic resin film, but other materials may be used.

And, this embodiment uses silicone resin for the sealing resin layer, but other materials may be used.

In this embodiment, the V-groove 11A is disposed on the bottom 11 of the gas generating agent chamber 13, but it may be omitted.

INDUSTRIAL APPLICABILITY

As described above, this invention concentrates flames from the ignited primer into the small-diameter passage, accelerates the supply of heat into the gas generating agent chamber, accelerates the ignition agent and the driving agent in the gas generating agent chamber, and decreases a time required for breaking the bottom of the gas generating chamber, thereby enabling to decrease a time required to retract the seat belt.

The invention can keep the primer horizontal with respect to the bottom of the primer chamber while providing the effect of the invention described in claim 1.

The invention can reliably break the bottom of the gas generating agent chamber while providing the effects of claims 1 and 2.

The invention can decrease a distance between the primer and the gas generating agent chamber because one side of the primer chamber is open toward the gas generating agent chamber. Thus, flames from the activated primer directly enter the gas generating agent chamber, the flames have an accelerated inflammation rate, and the ignition agent and the driving agent can be ignited quickly.

The sealing resin layer prevents external humidity from entering the gas generating agent chamber and can keep the gas generating agent chamber airtight. Thus, external humidity is prevented from damping the ignition agent and the driving agent in the gas generating agent chamber, and the ignition agent and the driving agent can be ignited with reliability.

And, utilizing a force for caulking the primer holder by the caulking part of the casing, the sealing resin layer can be held airtight between the surface of the primer holder on the primer side and the caulking part of the casing. Thus, the gas generating agent chamber can be kept airtight, eliminating the necessity of mounting an 0-ring which is generally used as a sealing member.

According to the invention, the sealing resin layer and the first thin film material prevent external humidity from entering the gas generating agent chamber, and the gas generating agent chamber can be kept in a sealed state. Thus, the ignition agent and the driving agent within the gas generating agent chamber are prevented from being damped by external humidity and can be ignited reliably.

Utilizing a force for caulking the primer holder by the caulking part of the casing, the sealing resin layer can be held airtight between the surface of the primer holder on the primer side and the caulking part of the casing. And, the first thin film material is held between the surface of the primer holder opposite to the primer side and the shoulder of the casing. Thus, the gas generating agent chamber can be kept airtight, eliminating the necessity of mounting an 0-ring which is generally used as a sealing member.

When caulking by the caulking part of the casing, the sealing resin in a gel state which forms the sealing resin layer is previously applied to the surface of the primer holder on the primer side, so that the sealing resin layer conforms to the shape of the caulking part, providing reliable sealing properties.

In this invention, a second thin film mater nil, which seals one end of the small-diameter passage, may be held between the bottom of the primer chamber and the primer. Thus, humidity is prevented from entering the gas generating agent chamber from the primer chamber through the small-diameter passage, enabling to enhance the reliability of ignition.

According to the invention, the first thin film material is made of a synthetic resin film, enabling to seal the gas generating agent chamber airtight.

According to the invention, the first thin film material is prepared by applying a pressure sensitive adhesive to a synthetic resin film, so that the gas generating agent chamber can be made airtight more securely.

What is claimed is:

1. A gas generator for a seat belt retracting power generating device comprising:

a cylindrical casing with a one open end, with an inner wall;

a cylindrical holder chamber disposed at the one open end of the casing;

a gas generating agent chamber which is communicated with the holder chamber via a shoulder formed on the inner wall of the casing and wherein the gas generating agent chamber has a diameter smaller than the diameter of the inner wall of the holder chamber, thereby forming the shoulder;

an ignition agent and a driving agent housed in the gas generating agent chamber, a primer holder which has a surface and which is housed in the holder chamber:

a primer chamber in the primer holder open toward the one open end of the casing and having a bottom face;

a caulking part which is formed at the one open end of the casing to hold the primer holder, a sealing resin layer which is applied between the surface of the primer holder on the primer chamber side and the caulking part of the casing;

a primer held within the primer chamber;

a small-diameter passage which is formed in the primer holder, communicates the gas generating agent chamber and the primer chamber, and has an inverted conical-shaped part having a tapered angle of 60 to 120 degrees formed at an end of the passage which communicates with the primer chamber; and a first thin film material which is held between the surface of the primer holder opposite to the primer and the shoulder of the casing.

2. A gas generator for a seat belt retracting power generating device according to claim 1, wherein a second thin film material for sealing one end of the small-diameter passage is held between the bottom face of the primer chamber and the primer.

3. A gas generator for a seat belt retracting power generating device according to claim 1, wherein a space is provided between the first thin film material and the ignition agent.

* * * * *